United States Patent
Lim et al.

(10) Patent No.: US 11,264,843 B1
(45) Date of Patent: Mar. 1, 2022

(54) SYSTEM FOR WIRELESS POWER TRANSMISSION

(71) Applicant: KOREA ELECTRONICS TECHNOLOGY INSTITUTE, Seongnam-si (KR)

(72) Inventors: Yong Seok Lim, Seoul (KR); Hae Yong Jung, Bucheon-si (KR); Tai Gil Kwon, Seongnam-si (KR); Yong Seong Kim, Goyang-si (KR); Yongju Park, Goyang-si (KR)

(73) Assignee: Korea Electronics Technology Institute, Seongnam-si (KR)

(*) Notice: Subject to any disclaimer, the term of this patent is extended or adjusted under 35 U.S.C. 154(b) by 0 days.

(21) Appl. No.: 17/127,419

(22) Filed: Dec. 18, 2020

(30) Foreign Application Priority Data

Sep. 2, 2020 (KR) .......................... 10-2020-0111944

(51) Int. Cl.
| | |
|---|---|
| *H02J 50/60* | (2016.01) |
| *H02J 50/12* | (2016.01) |
| *H02J 50/40* | (2016.01) |
| *B60L 53/55* | (2019.01) |
| *B60L 53/30* | (2019.01) |
| *B60L 53/124* | (2019.01) |

(52) U.S. Cl.
CPC ............ *H02J 50/60* (2016.02); *B60L 53/124* (2019.02); *B60L 53/30* (2019.02); *B60L 53/55* (2019.02); *H02J 50/12* (2016.02); *H02J 50/402* (2020.01)

(58) Field of Classification Search
CPC . B60L 53/124; H02J 5/00; H02J 7/025; H02J 50/10; H02J 50/12; H02J 50/402; H02J 50/60
See application file for complete search history.

(56) References Cited

U.S. PATENT DOCUMENTS

2012/0175967 A1* 7/2012 Dibben .................. H02J 50/30
307/104
2017/0317721 A1* 11/2017 Kozaki .................. A01K 29/00

* cited by examiner

*Primary Examiner* — Levi Gannon
(74) *Attorney, Agent, or Firm* — NSIP Law

(57) ABSTRACT

The present invention provides a system tar wireless power transmission, wherein the system is a system for wireless power transmission detecting a foreign object, including a power transmitting coil for transmitting AC power, a power receiving coil for receiving the AC power transmitted from the power transmitting coil wherein the power receiving coil is spaced apart from the power transmitting coil, and a detection circuit for detecting a foreign object located between the power transmitting coil and the power receiving coil wherein a first resistor and a first detection coil connected in series, and a second resistor and a second detection coil connected in series are connected in parallel, and wherein at least one of the first detection coil and the second detection coil is disposed between the power transmitting coil and the power receiving coil.

13 Claims, 12 Drawing Sheets

(a)

(b)

(c)

(d)

(a)

(b)

(c)

(d)

SYSTEM FOR WIRELESS POWER TRANSMISSION

CROSS-REFERENCE TO RELATED APPLICATION

This application claims priority to and the benefit of Korean Patent Application Nos. 10-2020-0111944, filed on Sep. 2, 2020 and 10-2020-0158825, filed on Nov. 24, 2020, the disclosure of which is incorporated herein by reference in its entirety.

BACKGROUND

1. Field of the Invention

The present invention relates to a system for wireless power transmission, and more specifically, the present invention relates to a system for wireless power transmission including a detection circuit capable of detecting a relatively small foreign object.

2. Discussion of Related Art

Electric charging systems such as electric vehicles, automated guided vehicles (AGV), robots, and the like are equipped with a battery to receive electric power. In this case, when the remaining amount of the battery is below a certain level, it is necessary to charge the battery, and as electric vehicles and the like move to a charging station to charge the battery, a power receiving cable is connected to the electric vehicle and the like to receive electric power.

However, such a charging method has inconvenience of having to move to a charging station for charging the battery and connecting a cable for charging.

Accordingly, there is a growing demand for a non-contact charging system capable of automatically charging electric power without a cable connection for charging, which can supply electric power to an electric vehicle and the like while driving, and even when moving to an electric charging station.

In order to receive electric power without contact in this way, wireless charging technology is required. The wireless charging technology is a technology in which a power transmitting coil wirelessly transmits electric power to a power receiving coil provided in an electric vehicle or the like, and a clearance space of a predetermined distance or more exists between the power transmitting coil and the power receiving coil.

In this case, during wireless power transmission, if a foreign object exists in the clearance space between the power transmitting coil and the power receiving coil, it may cause a malfunction of the wireless charging system, and also a fire may occur due to heat generation of the foreign object.

As a conventional technology for solving the above problem, there is a technology for determining whether a foreign object exists between the power transmitting coil and the power receiving coil, by detecting a voltage induced in a detection coil by placing a detection coil between a power transmitting coil and a power receiving coil.

However, the conventional technology has a limitation in detecting a foreign object having a relatively small size, because the voltage induced in the detection coil is very small when the size of the foreign object is relatively small such as a coin.

In order to overcome such a limitation, a technique for detecting a foreign object by amplifying the induced voltage has been proposed, but in this case, it is difficult to accurately detect a foreign object because noise is also amplified.

SUMMARY OF THE INVENTION

In order to solve the problems of the conventional technology as described above, the present invention is directed to providing a system for wireless power transmission capable of detecting a relatively small foreign object such as a coin.

The technical problems to be achieved in the present invention are not limited to the technical problem mentioned above, and other technical problems that are not mentioned can be clearly understood by those of ordinary skill in the technical field to which the present invention pertains from the following description.

In order to solve the above-mentioned problem, the present invention provides a system for wireless power transmission, wherein the system is a system for wireless power transmission detecting a foreign object, including a power transmitting coil for transmitting AC power, a power receiving coil for receiving the AC power transmitted from the power transmitting coil wherein the power receiving coil is spaced apart from the power transmitting coil, and a detection circuit for detecting a foreign object located between the power transmitting coil and the power receiving coil wherein a first resistor and a first detection coil connected in series, and a second resistor and a second detection coil connected in series are connected in parallel, and wherein at least one of the first detection coil and the second detection coil is disposed between the power transmitting coil and the power receiving coil.

Herein, the detection circuit may detect a foreign object located between the power transmitting coil and the power receiving coil based on a difference between a first voltage between the first resistor and the first detection coil and a second voltage between the second resistor and the second detection coil.

In addition, the detection circuit may determine that a foreign object is located between the power transmitting coil and the power receiving coil when the difference between the first voltage and the second voltage is more than or equal to a reference voltage.

In addition, the first detection coil and the second detection coil may be formed in a plurality and may be arranged to intersect each other on the power transmitting coil.

In addition, the detection circuit may further include a switch for selectively connecting a plurality of the first detection coils and a plurality of the second detection coils to the detection circuit.

In addition, the first detection coil and the second detection coil may be coils that are mutually symmetrical with respect to a center.

In addition, the first detection coil may be a reference inductor having a constant inductance, and the second detection coil may be formed in a plurality and arranged to intersect each other on the power transmitting coil.

In addition, the detection circuit may further include a switch for selectively connecting the plurality of the second detection coils to the detection circuit.

In addition, the detection circuit may further include a first capacitor connected in parallel with the first detection coil; and a second capacitor connected in parallel with the second detection coil.

In addition, the detection circuit may further include a first capacitor connected in series with the first detection coil, and a second capacitor connected in series with the second detection coil.

In addition, the system for wireless power transmission of the present invention may further include an AC generator for applying AC power to both ends of the detection circuit.

Herein, the AC power applied by the AC generator may be less than the size of the AC power transmitted by the power transmitting coil and more than the frequency of the AC power.

In addition, the AC generator may apply the AC power before the power transmitting coil transmits the AC power to the power receiving coil.

In addition, the AC generator may apply the AC power while the power transmitting coil transmits the AC power to the power receiving coil, and a harmonic component included in the AC power may be filtered.

According to the present invention, by replacing the inductor of a detection circuit with a detection coil, it is possible to detect a slight change in the magnetic field, and through this, it is possible to detect relatively small foreign object such as a coin.

The effects that can be obtained in the present invention are not limited to the above-mentioned effects, and other effects not mentioned can be clearly understood by those of ordinary skill in the technical field to which the present invention pertains from the following description.

DETAILED DESCRIPTION OF EXAMPLE EMBODIMENTS

In order to fully understand the configuration and effects of the present invention, preferred exemplary embodiments of the present invention will be described with reference to the accompanying drawings. However, the present invention is not limited to the exemplary embodiments disclosed below, but may be implemented in various forms and various modifications may be added. However, the description of the present exemplary embodiments is provided to complete the disclosure of the present invention, and to fully inform the scope of the invention to those of ordinary skill in the technical field to which the present invention pertains. In the accompanying drawings, for convenience of description, the size of the components is enlarged compared to the actual size, and the ratio of each component may be exaggerated or reduced.

Terms such as 'first' and 'second' may be used to describe various elements, but the elements should not be limited by the above terms. The above terms may be used only for the purpose of distinguishing one component from another component. For example, without departing from the scope of the present invention, the 'first element' may be named 'the second element', and similarly, the 'second element' may also be named 'the first element'. In addition, expressions in the singular include plural expressions unless clearly expressed otherwise in context. Unless otherwise defined, terms used in the exemplary embodiments of the present invention may be interpreted as meanings commonly known to those of ordinary skill in the art.

Figure 1:
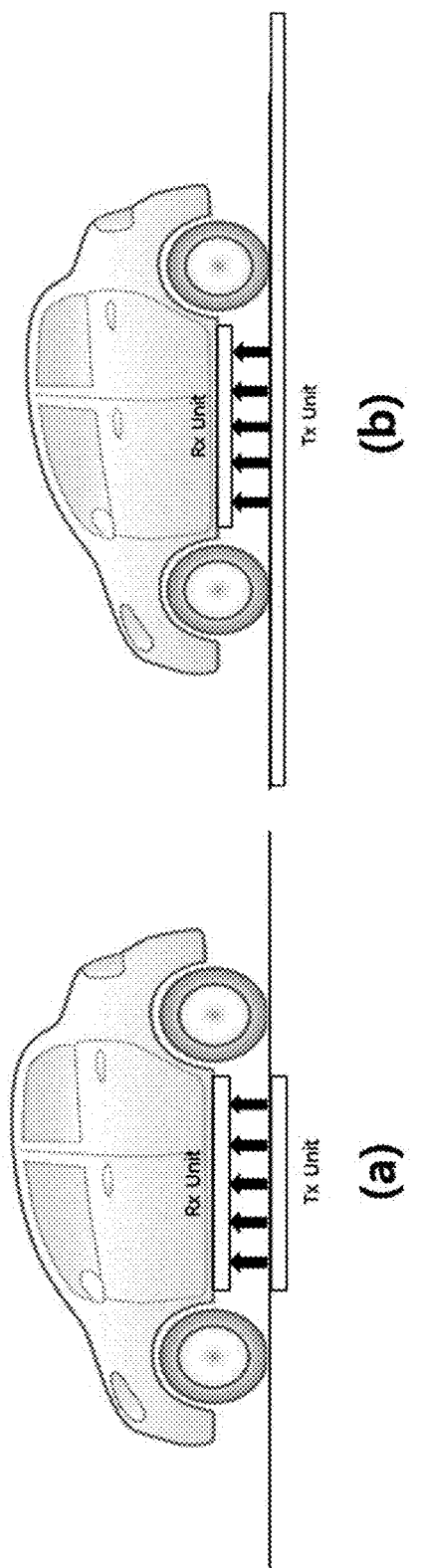
FIG. 1 is a diagram for describing a wireless charging method of a system for wireless power transmission according to an exemplary embodiment of the present invention.

FIG. 1 is a diagram for describing a wireless charging method of a system for wireless power transmission according to an exemplary embodiment of the present invention.

Referring to FIG. 1, a power transmitting unit (Tx unit) may be installed on the ground, and a power receiving unit (Rx unit) may be installed under an electric vehicle, an automated guided vehicle (AGV), and the like. Herein, when the electric vehicle, the AGV, and the like move to the ground where the power transmitting unit (Tx Unit) is installed, the power transmitting unit (Tx Unit) and the power receiving unit (Rx Unit) may be spaced apart by a predetermined distance or more and disposed opposite to each other.

Accordingly, the power receiving unit (Rx Unit) may receive electric power wirelessly from the power transmitting unit (Tx Unit).

In this case, as illustrated in FIG. 1 (a), the power transmitting unit (Tx Unit) may be installed only in a specific area of the ground. Accordingly, the power receiving unit (Rx Unit) may wirelessly receive electric power from the power transmitting unit (Tx Unit) while the electric vehicle, the AGV, and the like are stopped after moving to the specific area.

In addition, as illustrated in FIG. 1 (b), the power transmitting unit (Tx Unit) may be installed along a path in which the electric vehicle, the AGV, and the like move. Accordingly, the power receiving unit (Rx Unit) may wirelessly receive electric power from the power transmitting unit (Tx Unit) while the electric vehicle, the AVG, and the like are moving.

Figure 2:
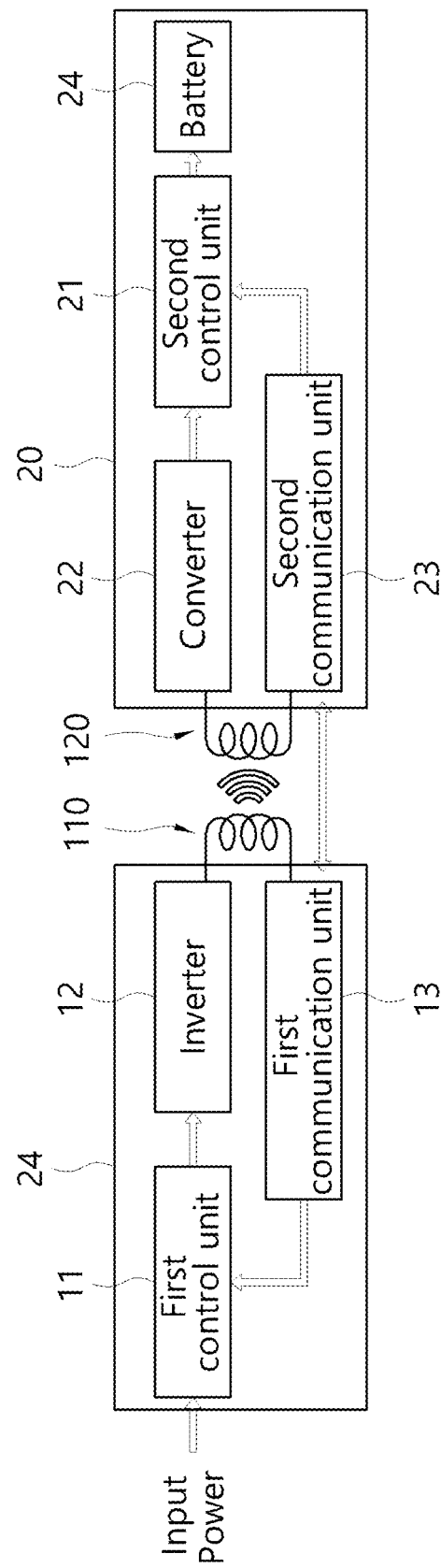
FIG. 2 is a schematic block diagram of a system for wireless power transmission according to an exemplary embodiment of the present invention.

FIG. 2 is a schematic block diagram of a system for wireless power transmission according to an exemplary embodiment of the present invention.

As illustrated in FIG. 2, the system for wireless power transmission may include a power transmitting unit 10 and a power receiving unit 20.

The power transmitting unit 10 may include a first control unit 11, an inverter 12, a first communication unit 13, and a power transmitting coil 110, and the power receiving unit 20 may configured to include a second control unit 21, a converter 22, a second communication unit 23, and a battery 24.

The second control unit 21 of the power receiving unit 20 may obtain information of a battery 24 from the battery 24 of the power receiving unit 20. In addition, the second communication unit 23 of the power receiving unit 20 may transmit information of the battery 24 to the first communication unit 23 of the power transmitting unit 10.

The power transmitting coil 110 may transmit communication power required for transmission of the information of the battery 24 to the power receiving coil 120. Accordingly, even when the battery 24 of the power receiving unit 20 is completely discharged, the power receiving unit 20 may transmit information of the battery 24 to the power transmitting unit 10.

Herein, information of the battery 24 may be transmitted in an in-band communication method. Herein, the in-band communication method is a communication method using the same frequency band as the wireless power transmission frequency.

The first control unit 11 of the power transmitting unit 10 may control the inverter 12 of the power transmitting unit 10 based on information of the battery 24 of the power receiving unit 20.

The inverter 12 may convert input DC power into AC power. In addition, the power transmitting coil 110 may transmit AC power converted by the inverter 12 to the power receiving coil 120.

The power receiving coil 120 may receive AC power from the power transmitting coil 110. In addition, the converter 22 of the power receiving unit 20 may convert AC power into DC power, and the second control unit 21 of the power receiving unit 20 may use the converted DC power to charge the battery 24 of the power receiving unit 20.

Figure 3:
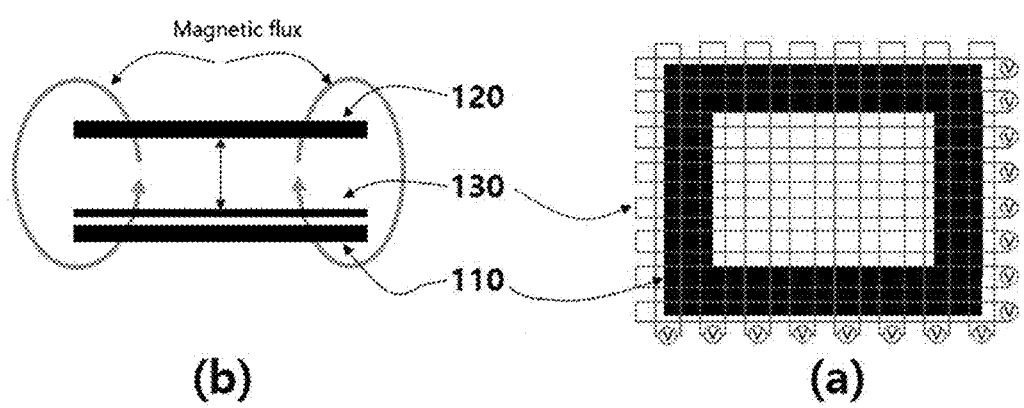
FIG. 3 is a diagram illustrating an arrangement structure of a detection coil of a system for wireless power transmission according to an exemplary embodiment of the present invention.
Figure 4:
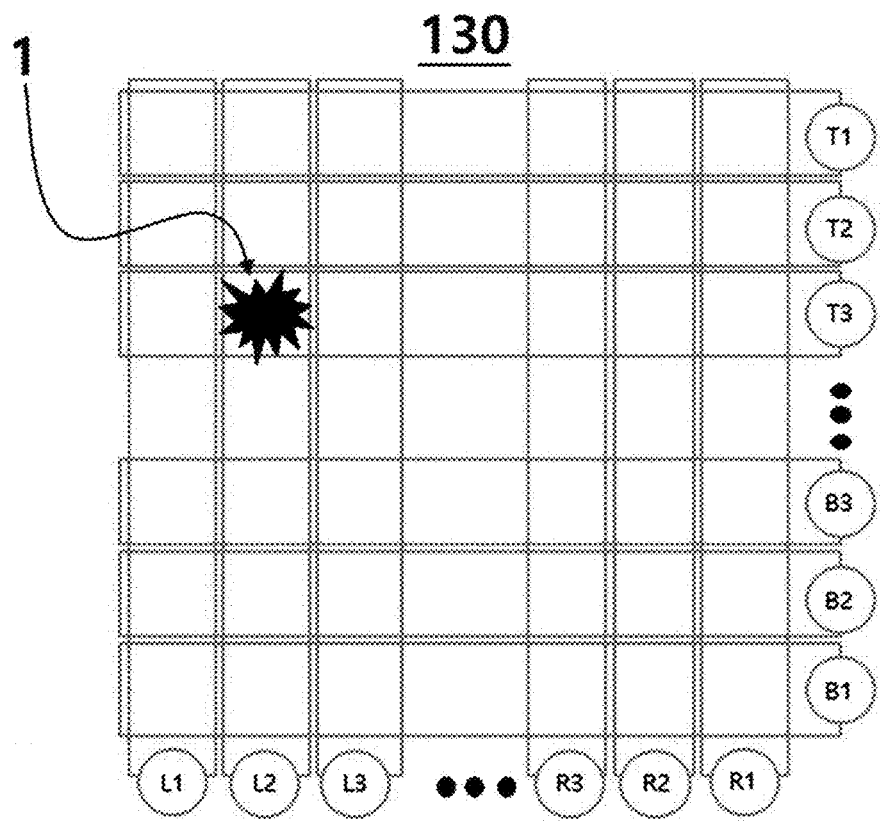
FIG. 4 is a diagram for describing a method for detecting a foreign object in a system for wireless power transmission according to an exemplary embodiment of the present invention.

FIG. 3 is a diagram illustrating an arrangement structure of a detection coil of a system for wireless power transmission according to an exemplary embodiment of the present invention, and FIG. 4 is a diagram for describing a method for detecting a foreign object in a system for wireless power transmission according to an exemplary embodiment of the present invention.

As illustrated in FIG. 3, the system for wireless power transmission according to an exemplary embodiment of the present invention may include a power transmitting coil 110, a power receiving coil 120, and a detection coil 130.

The power transmitting coil 110 may transmit AC power. In addition, the power receiving coil 1:20 may be spaced apart from the power transmitting coil 110 and may receive AC power transmitted by the power transmitting coil 110.

The detection coil 130 may be disposed between the power transmitting coil 110 and the power receiving coil 120 and detect a foreign object (FO) 1 located between the power transmitting coil 110 and the power receiving coil 120. Herein, the foreign object 1 may be a metallic material such as a saw, a hammer, a coin, and the like, or a living organism such as a cat, a mouse, and the like.

As illustrated in FIG. 4, the detection coil 130 may be formed in a plurality and arranged to intersect each other on the power transmitting coil 110. Specifically, the detection coil 130 may be formed of a plurality of coils (T1, T2, T3, . . . , B3, B2, B1) crossing the power transmitting coil 110 in the horizontal direction, and a plurality of coils (L1, L2, L3, . . . , R3, R2, R1) crossing the power transmitting coil 110 in the vertical direction to be disposed on the power transmitting coil 110 in a matrix form.

Herein, T1 and B1, T2 and B2, T3 and B3 are mutually symmetrical with respect to a center, respectively, and L1 and R1, L2 and R2, and L3 and R3 are mutually symmetrical with respect to the center, respectively. Further, the detection coils 130 that are mutually symmetrical may be initially compensated such that the balance is correct.

When there is no foreign object 1 between the power transmitting coil 110 and the power receiving coil 120, a constant magnetic flux is generated between the power transmitting coil 110 and the power receiving coil 120 by AC power transmitted from the power transmitting coil 110 to the power receiving coil 120, and a constant voltage is induced to the detection coil 130 by the magnetic flux.

In contrast, when there is a foreign object 1 between the power transmitting coil 110 and the power receiving coil 1:20, the magnetic flux generated between the power transmitting coil 110 and the power receiving coil 120 changes, and the voltage of the detection coil 130 is also changed by the changed magnetic flux.

In this way, the system for wireless power transmission according to an exemplary embodiment of the present invention may determine whether a foreign object 1 exists between the power transmitting coil 110 and the power receiving coil 120 by detecting a voltage induced in the detection coil 130.

In addition, the system for wireless power transmission according to an exemplary embodiment of the present invention may determine the location of a foreign object 1 existing between the power transmitting coil 110 and the power receiving coil 120, by mutually comparing the voltages induced in the detection coils 130 that are mutually symmetrical.

For example, by comparing each of the detection coils 130 that are mutually symmetrical, when the balance of the voltages induced at L2 and R2 is wrong (i.e., when a difference between the voltages induced in each coil occurs), it may be determined that a foreign object 1 is located at L2 or R2, and when the balance of the voltages induced at T3 and B3 is wrong, it may be determined that a foreign object 1 is located at the intersection of L2 and T3.

However, when the size of a foreign object 1 is relatively small such as a coin, the voltage difference induced in the mutually symmetrical detection coils 130 is very small such that there is a limitation in detecting a foreign object 1 having a relatively small size.

In order to overcome this limitation, a technology for detecting a foreign object 1 by amplifying the induced voltage difference has been proposed, but in this case, it is difficult to accurately detect the foreign object 1 because noise is also amplified.

Figure 5:
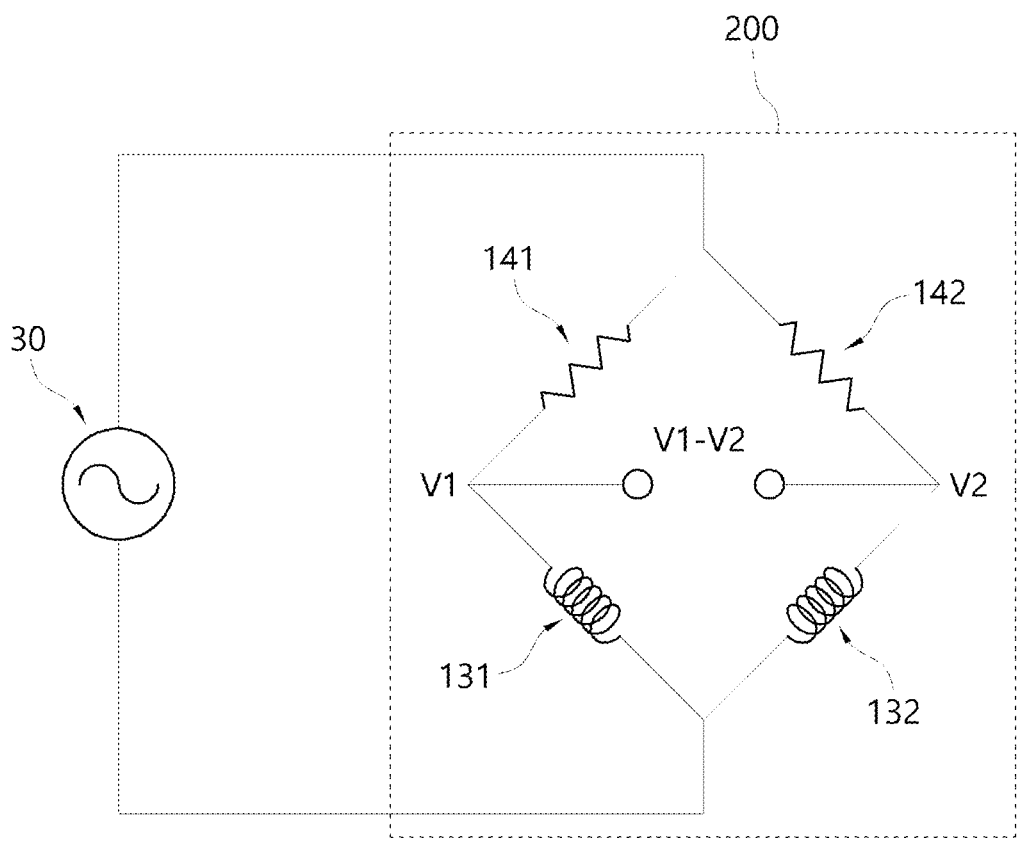
FIG. 5 is a diagram illustrating a first example of a detection circuit in a system for wireless power transmission according to an exemplary embodiment of the present invention.
Figure 6:
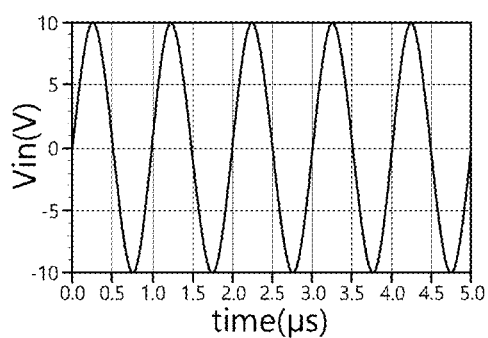
FIG. 6 is a graph experimentally analyzing the detection performance of the detection circuit according to the first example of the present invention.
Figure 6:
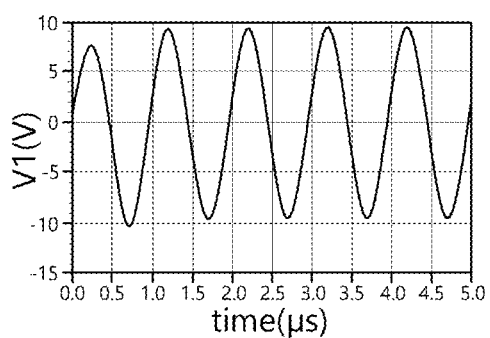
Figure 6:
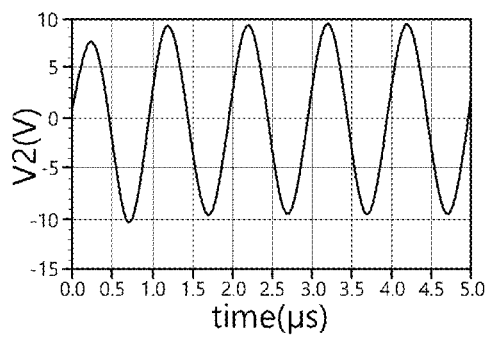
Figure 6:
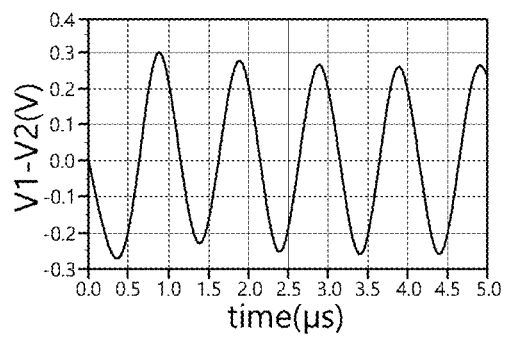

FIG. 5 is a diagram illustrating a first example of a detection circuit in a system for wireless power transmission according to an exemplary embodiment of the present invention, and FIG. 6 is a graph experimentally analyzing the detection performance of the detection circuit according to the first example of the present invention.

As illustrated in FIG. 5, the detection circuit 200 according to the first example of the present invention may detect a foreign object 1 located between the power transmitting coil 110 and the power receiving coil 120, and may be configured to include a first resistor 141, a first detection coil 131, a second resistor 142, and a second detection coil 132.

The first resistor 141 and the first detection coil 131 are connected in series, and the second resistor 142 and the second detection coil 132 are connected in series. In addition, the series-connected first resistor 141 and first detection coil 131, and the series-connected second resistor 142 and second detection coil 132 are connected in parallel. In addition, an AC generator 30 is connected to both ends of the detection circuit 200, and the detection circuit 200 receives AC power applied from the AC generator 30.

Herein, at least one of the first detection coil 131 and the second detection coil 132 may be disposed between the power transmitting coil 110 and the power receiving coil 120.

In theory, if the value of the first resistor 141 or the second resistor 142 is adjusted according to the frequency of the AC power applied to the detection circuit 200, the difference (V1−V2) between the first voltage (V1) and the second voltage (V2) becomes zero (equilibrium), and the product of the first resistor 141 and the second detection coil 132 and die product of die second resistor 142 and the first detection coil 131 become the same. The detection circuit 200 of the present invention may operate in such an equilibrium state.

The detection circuit 200 may detect a foreign object 1 located between the power transmitting coil 110 and the power receiving coil 120 based on a difference between a first voltage (VD between the first resistor 141 and the first detection coil 131 and a second voltage (V2) between the second resistor 142 and the second detection coil 132.

Specifically, when the difference (V1−V2) between the first voltage (V1) and the second voltage (V2) is more than or equal to a reference voltage, the detection circuit 200 may determine that a foreign object is located between the power transmitting coil 110 and the power receiving coil 120.

Referring to FIGS. 3 and 4, the detection coil 130 may include a first detection coil 131 and a second detection coil 132, and the first detection coil 131 and the second detection coil 132 may be formed in a plurality and arranged to intersect each other on the power transmitting coil 110.

Herein, the first detection coil 131 and the second detection coil 132 may be coils that are mutually symmetrical with respect to a center.

In general, the detection coil 130 in which a foreign object 1 is located has an inductance (L) less than that of the detection coil 130 in which a foreign object 1 is not located. Assuming that a foreign object 1 is located in the first detection coil 131, by setting the inductance (L) of the first detection coil 131 to 45 µH and the inductance (L) of the second detection coil 132 to 50 µH in the detection circuit 200, and applying an AC voltage (Vin) (the size is 10 V, and the frequency is 1 MHz) (a) to the AC circuit 200, simulations were performed in FIG. 6 for a first voltage (V1) (b) between the first resistor 141 and the first detection coil 131, a second voltage (V2) (c) between the second resistor 142 and the second detection coil 132, and the difference (V1−V2) between the first voltage (V1) and the second voltage (V2), respectively.

As a result of the simulations, it can be confirmed that the size difference of the first voltage (V1) and the second voltage (V2) is relatively small, but the phase difference occurs to be relatively large. Due to this phase difference, it can be confirmed that the difference (V1−V2) between the first voltage (V1) and the second voltage (V2) over time occurs up to about a maximum of 0.3V. It can be confirmed that the difference value is increased by about 13 times or more compared to the result of a simulation without using the detection circuit 200 of the present invention under the same condition for a foreign object 1.

As such, by replacing the inductor constituting the detection circuit 200 with the first detection coil 131 and the second detection coil 132, the system for wireless power transmission according to an exemplary embodiment of the present invention may detect a slight change in the magnetic field between the power transmitting coil 110 and the power receiving coil 120, and through this, it is possible to detect a relatively small foreign object 1 such as a coin.

Accordingly, it is possible to prevent a fire and malfunction of the system for wireless power transmission that may occur due to a relatively small foreign object 1 in advance.

The AC power applied by the AC generator 30 may be less than the size of the AC power transmitted by the power transmitting coil 110 and may be more than the frequency of the AC power. For example, the power transmitting coil 110 may transmit AC power at 3.5 KW and 85 kHz to the power receiving coil 120, and the AC generator 30 may apply AC power at 10V and 1 MHz to the detection circuit 200.

The AC generator 30 may apply AC power before the power transmitting coil 110 transmits AC power to the power receiving coil 120. Accordingly, it is possible to prevent a harmonic component included in AC power from affecting the AC power and deteriorating the performance of the detection circuit 200.

In contrast, the AC generator 30 may apply AC power while the power transmitting coil 110 transmits AC power to the power receiving coil 120. In this case, a harmonic component included in the AC power may be filtered using a separate filter. Accordingly, it is possible to prevent the harmonic component included in the AC power from affecting the AC power and deteriorating the performance of the detection circuit 200.

Figure 7:
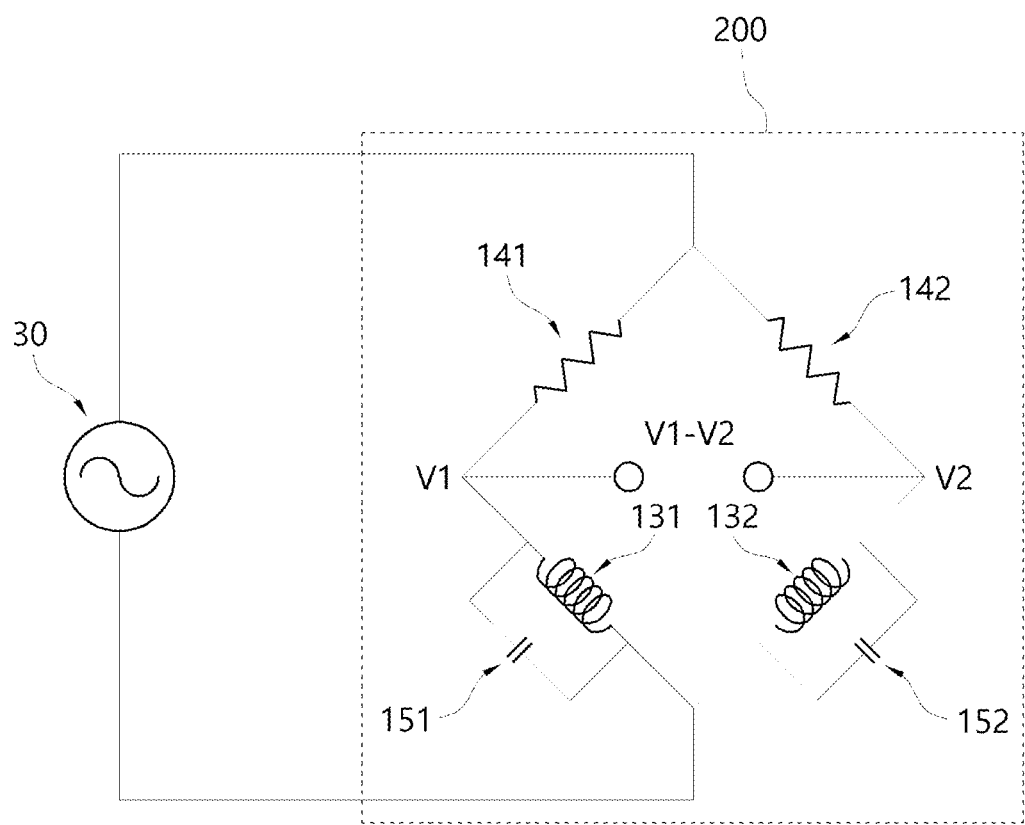
FIG. 7 is a diagram illustrating a second example of a detection circuit in system for wireless power transmission according to an exemplary embodiment of the present invention.
Figure 8:
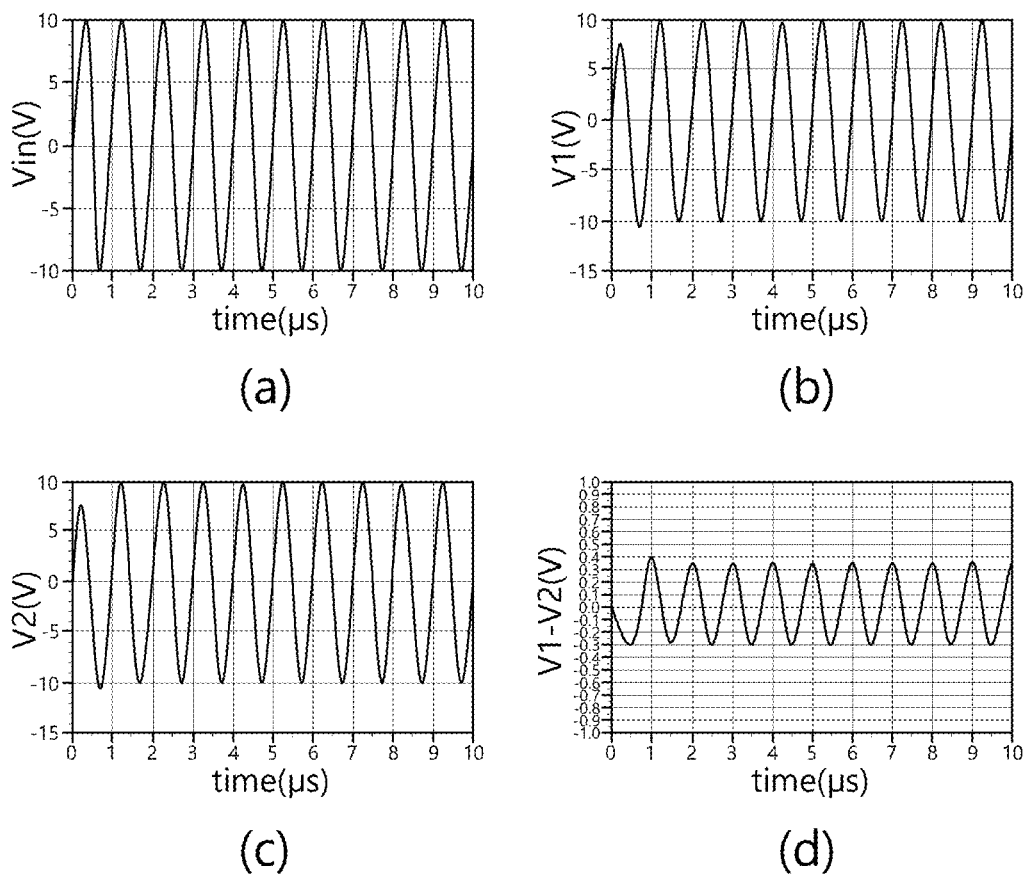
FIG. 8 is a graph experimentally analyzing the detection performance of the detection circuit according to the second example of the present invention.

FIG. 7 is a diagram illustrating a second example of a detection circuit in a system for wireless power transmission according to an exemplary embodiment of the present invention, and FIG. 8 is a graph experimentally analyzing the detection performance of the detection circuit according to the second example of the present invention.

As illustrated in FIG. 7, the detection circuit 200 according to the second example of the present invention may further include a first capacitor 151 connected in parallel with a first detection coil 131 and a second capacitor 152 connected in parallel with a second detection coil 132, compared to the first example.

Herein, the capacitances of the first capacitor 151 and the second capacitor 152 may be set according to the frequency of the AC power in consideration of the inductances of the first detection coil 131 and the second detection coil 132 such that parallel resonance is generated between the first detection coil 131 and the first capacitor 151, and the second detection coil 132 and the second capacitor 152.

Due to such parallel resonance, since the detection circuit 200 has a relatively high Q value (quality factor), it is possible to detect a slight change in the inductances (L) of the first detection coil 131 and the second detection coil 132, and through this, it is possible to detect a relatively small foreign object 1 such as a coin.

Assuming that a foreign object 1 is located in the first detection coil 131, by setting the inductance (L) of the first detection coil 131 to 45 µH and the inductance (L) of the second detection coil 132 to 50 pH in the AC circuit 200, and applying an AC voltage (Yin) (the size is 10V, and the frequency is 1 MHz) (a) to the AC circuit 200, simulations were performed in FIG. 8 for a first voltage (V1) (b) between the first resistor 141 and the first detection coil 131, a second voltage (V2) (c) between the second resistor 142 and the second detection coil 132, and the difference (V1-V2) between the first voltage (V1) and the second voltage (V2), respectively.

As a result of the simulations, due to the phase difference between the first voltage (V1) and the second voltage (V2), it can be confirmed that the difference (V1-V2) between the first voltage (V1) and the second voltage (V2) over time occurs up to about a maximum of 0.3V. It can be confirmed that the difference value is increased by about 13 times or more compared to the result of a simulation without using the detection circuit 200 of the present invention under the same condition for a foreign object 1.

As such, by replacing the inductor constituting the detection circuit 200 with the first detection coil 131 and the second detection coil 132, the system for wireless power transmission according to an exemplary embodiment of the present invention may detect a slight change in the magnetic field between the power transmitting coil 110 and the power receiving coil 120, and through this, it is possible to detect a relatively small foreign object 1 such as a coin.

Accordingly, it is possible to prevent a fire and malfunction of the system for wireless power transmission that may occur due to a relatively small foreign object 1 in advance.

Figure 9:
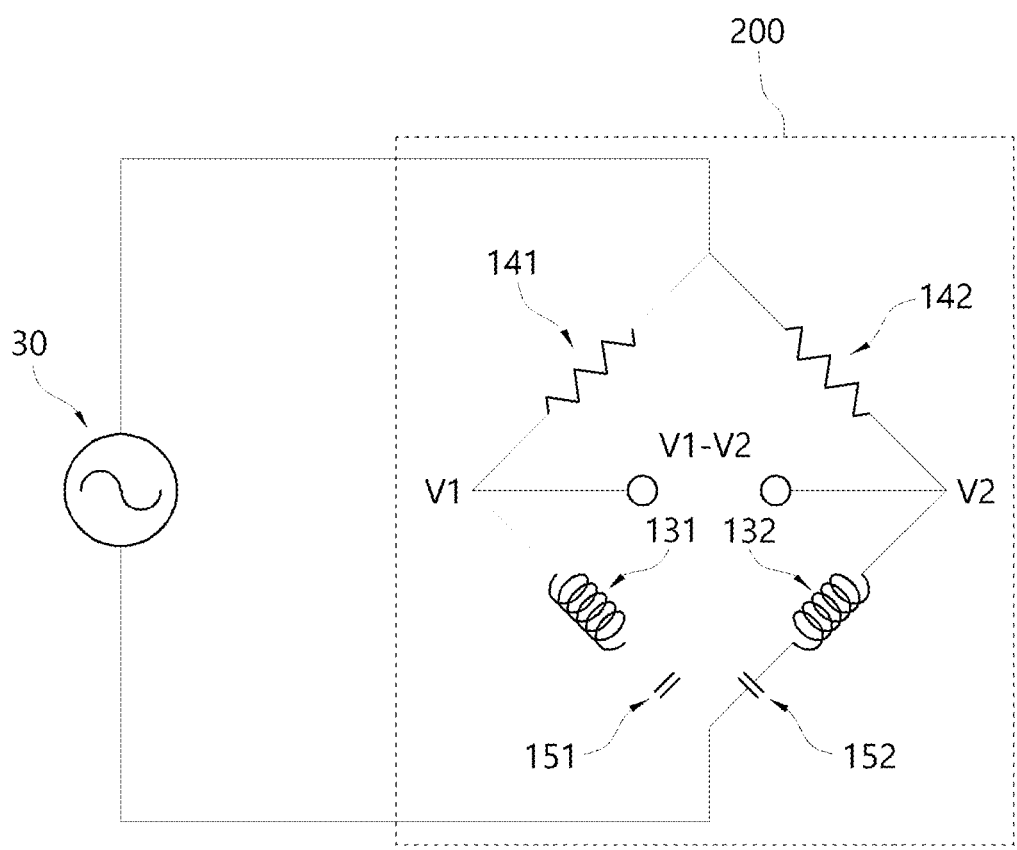
FIG. 9 is a diagram illustrating a third example of a detection circuit in a system for wireless power transmission according to an exemplary embodiment of the present invention.
Figure 10:
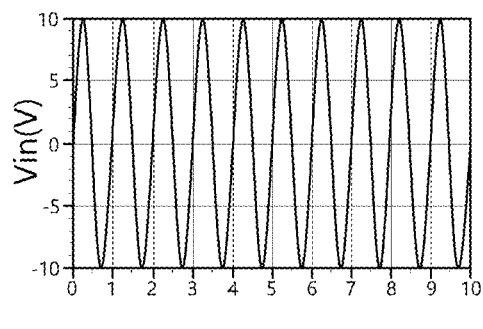
FIG. 10 is a graph experimentally analyzing the detection performance of the detection circuit according to the third example of the present invention.
Figure 10:
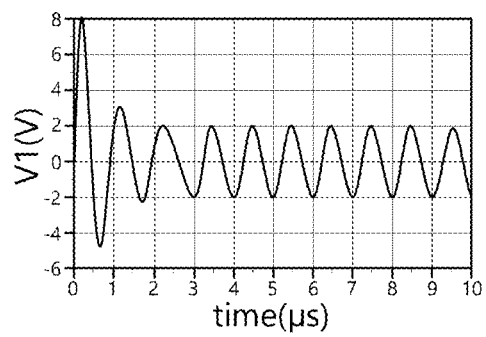
Figure 10:
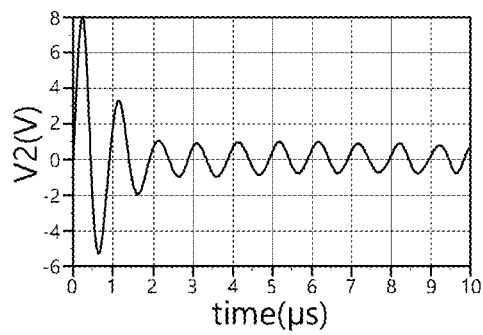
Figure 10:
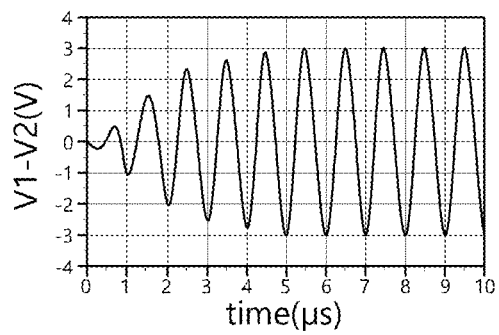

FIG. 9 is a diagram illustrating a third example of a detection circuit in a system for wireless power transmission according to an exemplary embodiment of the present invention, and FIG. 10 is a graph experimentally analyzing the detection performance of the detection circuit according to the third example of the present invention.

As illustrated in FIG. 9, the detection circuit 200 according to the third example of the present invention may further include a first capacitor 151 connected in series with a first detection coil 131 and a second capacitor 152 connected in series with a second detection coil 132, compared to the first example.

Herein, the capacitances of the first capacitor 151 and the second capacitor 152 may be set according to the frequency of the AC power in consideration of the inductances of the first detection coil 131 and the second detection coil 132 such that series resonance is generated between the first detection coil 131 and the first capacitor 151, and the second detection coil 132 and the second capacitor 152.

Due to such series resonance, since the detection circuit 200 has a relatively high Q value (quality factor), it is possible to detect a slight change in inductance (L), and through this, it is possible to detect a relatively small foreign object 1 such as a coin.

Assuming that a foreign object 1 is located in the first detection coil 131, by setting the inductance (L) of the first detection coil 131 to 45 µH and the inductance (L) of the second detection coil 132 to 50 µH in the AC circuit 200, and applying an AC voltage (yin) (the size is 10V, and the frequency is 1 MHz) (a) to the AC circuit 200, simulations were performed in FIG. 10 for a first voltage (V1) (b) between the first resistor 141 and the first detection coil 131, a second voltage (V2) (c) between the second resistor 142 and the second detection coil 132, and the difference (V1-V2) between the first voltage (V1) and the second voltage (V2), respectively.

As a result of the simulations, due to the phase difference between the first voltage (V1) and the second voltage (V2), it can be confirmed that the difference (V1-V2) between the first voltage (V1) and the second voltage (V2) over time occurs up to about a maximum of 3V. It can be confirmed that the difference value is increased by about 10 times or more compared to the result of a simulation using the detection circuit 200 according to the first example of the present invention under the same condition for a foreign object 1.

As such, by replacing the inductor constituting the detection circuit 200 with the first detection coil 131 and the second detection coil 132 and connecting the first capacitor 151 and the second capacitor 152 to the first detection coil 131 and the second detection coil 132 in series, respectively, the system for wireless power transmission according to an exemplary embodiment of the present invention may detect a slight change in the magnetic field between the power transmitting coil 110 and the power receiving coil 120, and through this, it is possible to detect a relatively small foreign object 1 such as a coin.

Accordingly, it is possible to prevent a fire and malfunction of the system for wireless power transmission that may occur due to a relatively small foreign object 1 in advance.

Figure 11:
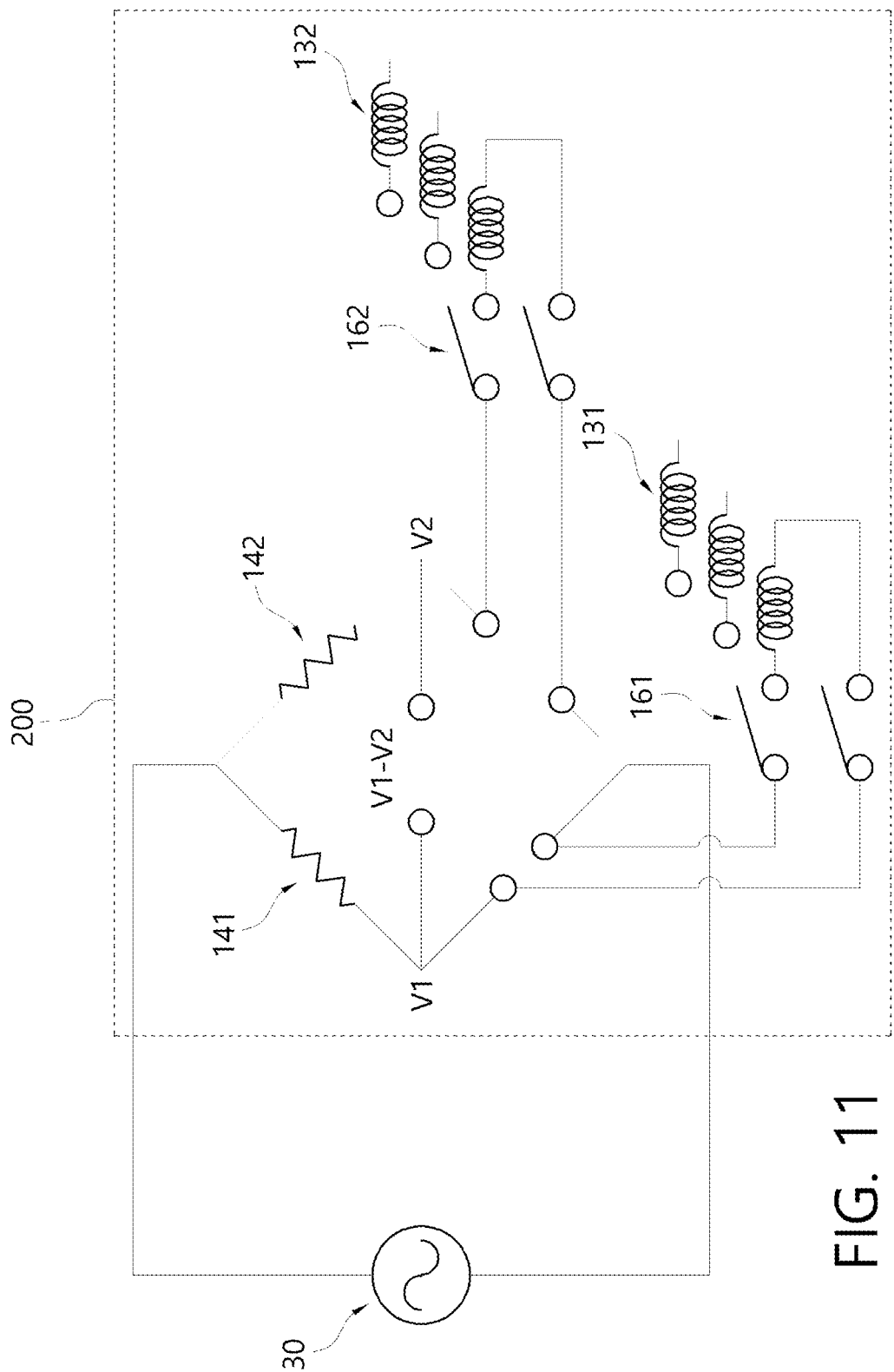
FIG. 11 is a diagram illustrating a fourth example of a detection circuit in a system for wireless power transmission according to an exemplary embodiment of the present invention.

FIG. 11 is a diagram illustrating a fourth example of a detection circuit in a system for wireless power transmission according to an exemplary embodiment of the present invention.

Referring to FIGS. 3 and 4, the detection coil 130 may include a first detection coil 131 and a second detection coil 132, and the first detection coil 131 and the second detection coil 132 may be formed in a plurality and arranged to intersect each other on a power transmitting coil (110).

Herein, the first detection coil 131 and the second detection coil 132 may be coils that are mutually symmetrical with respect to a center.

Since the mutually symmetrical first detection coil 131 and second detection coil 132 are replaced with an inductor of the detection circuit 200, the detection circuit 200 is required as many as the number of the first detection coils 131 or the second detection coils 132. Accordingly, the size of the power transmitting unit 10 increases, and the manufacturing cost thereof increases.

In order to solve such a problem, as illustrated in FIG. 11, the detection circuit 200 according to the fourth example of the present invention may further include a first switch 161 for selectively connecting a plurality of the first detection coils 131 to the detection circuit 200, and a second switch 162 for selectively connecting a plurality of the second detection coils 132 to the detection circuit 200.

Specifically, the first switch 161 is connected to the detection circuit 200 of the corresponding first detection coil 131, and the second switch 162 connects the second detection coil 132 symmetrical with the corresponding first detection coil 131 to the detection circuit 200. Then, the detection circuit 200 measures a voltage difference between the corresponding first detection coil 131 and the second detection coil 132 symmetrical thereto.

In this way, the first switch 161 and the second switch 162 sequentially connect the plurality of the first detection coils 131 and the plurality of the second detection coils 132 to the detection circuit 200.

As described above, since the detection circuit 200 according to the fourth example of the present invention can measure a voltage difference between the plurality of the first detection coils 131 and the plurality of the second detection coils 132 through one detection circuit 200, it is possible to minimize the size of the power transmitting unit 10 and reduce the manufacturing cost.

Figure 12:
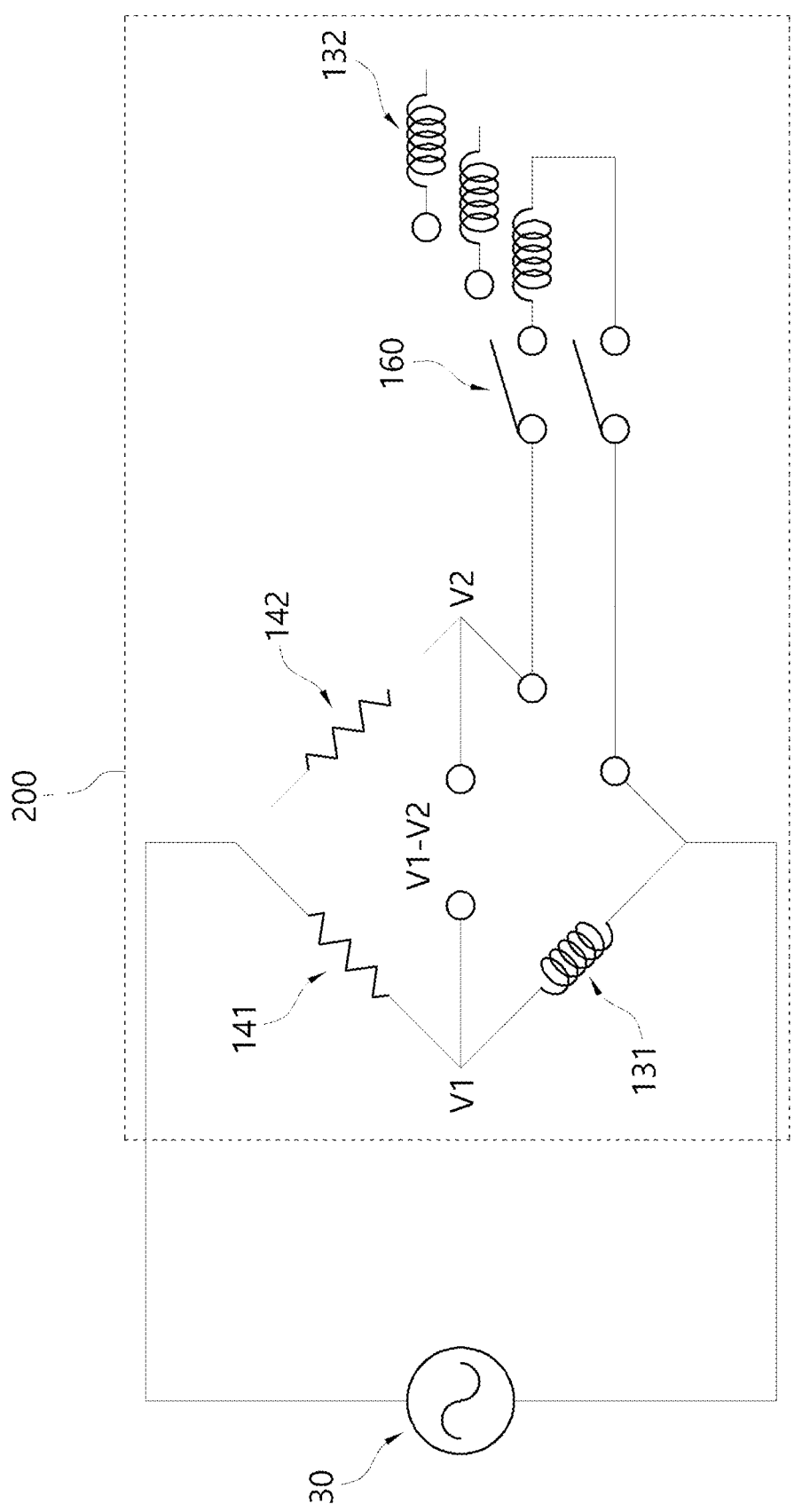
FIG. 12 is a diagram illustrating a fifth example of a detection circuit in a system for wireless power transmission according to an exemplary embodiment of the present invention.

FIG. 12 is a diagram illustrating a fifth example of a detection circuit in a system for wireless power transmission according to an exemplary embodiment of the present invention.

The detection coil 130 may include a first detection coil 131 and a second detection coil 132. Referring to FIG. 12, the first detection coil 131 may be a reference inductor having a constant inductance L, and referring to FIGS. 3 and 4, the second detection coil 132 may be formed in a plurality and arranged to intersect each other on a power transmitting coil 110.

Since the second detection coil 132 is replaced by an inductor of the detection circuit 200, the detection circuit 200 is required as many as the number of the second detection coils 132. Accordingly, the size of the power transmitting unit 10 increases, and the manufacturing cost thereof increases.

In order to solve such a problem, as illustrated in FIG. 12, the detection circuit 200 according to the fifth example of the present invention may further include a switch 160 for selectively connecting a plurality of the second detection coils 132 to the detection circuit 200.

Specifically, when the switch 160 is connected to the detection circuit 200 of the corresponding second detection coil 132, the detection circuit 200 measures a voltage difference between the corresponding second detection coil 132 and the first detection coil 131 which is a reference inductor.

In this way, the switch 160 sequentially connects the plurality of the second detection coils 132 to the detection circuit 200.

As described above, since the detection circuit 200 according to the fifth example of the present invention can measure a voltage difference between the plurality of the first detection coils 131 and the plurality of the second detection coils 132 through one detection circuit 200, it is possible to minimize the size of the power transmitting unit 10 and reduce the manufacturing cost.

In the detailed description of the present invention, specific exemplary embodiments have been described, but various modifications are possible without departing from the scope of the present invention Therefore, the scope of the present invention is not limited to the described exemplary embodiments, and should be determined by the claims to be described below and equivalents to the claims.

What is claimed is:

1. A system for wireless power transmission, wherein the system is a system for wireless power transmission detecting a foreign object, the system comprising:
   a power transmitting coil for transmitting AC power;
   a power receiving coil for receiving the AC power transmitted from the power transmitting coil wherein the power receiving coil is spaced apart from the power transmitting coil; and
   a detection circuit for detecting a foreign object located between the power transmitting coil and the power receiving coil wherein a first resistor and a first detection coil connected in series, and a second resistor and a second detection coil connected in series are connected in parallel, and
   wherein at least one of the first detection coil and the second detection coil is disposed between the power transmitting coil and the power receiving coil,
   wherein the detection circuit detects a foreign object located between the power transmitting coil and the power receiving coil based on a difference between a first voltage between the first resistor and the first detection coil and a second voltage between the second resistor and the second detection coil.

2. The system of claim 1, wherein the detection circuit determines that a foreign object is located between the power transmitting coil and the power receiving coil when the difference between the first voltage and the second voltage is more than or equal to a reference voltage.

3. The system of claim 1,
   wherein the first detection coil and the second detection coil are formed in a plurality and arranged to intersect each other on the power transmitting coil.

4. The system of claim 3, wherein the detection circuit further comprises a switch for selectively connecting a plurality of the first detection coils and a plurality of the second detection coils to the detection circuit.

5. The system of claim 3, wherein the first detection coil and the second detection coil are coils that are mutually symmetrical with respect to a center.

6. The system of claim 1, wherein the first detection coil is a reference inductor having a constant inductance, and the second detection coil is formed in a plurality and arranged to intersect each other on the power transmitting coil.

7. The system of claim 6, wherein the detection circuit further comprises a switch for selectively connecting the plurality of the second detection coils to the detection circuit.

8. The system of claim 1, wherein the detection circuit further comprises a first capacitor connected in parallel with the first detection coil; and a second capacitor connected in parallel with the second detection coil.

9. The system of claim 1, wherein the detection circuit further comprises a first capacitor connected in series with the first detection coil; and a second capacitor connected in series with the second detection coil.

10. The system of claim 1, further comprising an AC generator for applying AC power to both ends of the detection circuit.

11. The system of claim 10, wherein the AC power applied by the AC generator is less than the size of the AC power transmitted by the power transmitting coil and more than the frequency of the AC power.

12. The system of claim 10, wherein the AC generator applies the AC power before the power transmitting coil transmits the AC power to the power receiving coil.

13. The system of claim 10, wherein the AC generator applies the AC power while the power transmitting coil transmits the AC power to the power receiving coil, and a harmonic component included in the AC power is filtered.

* * * * *